US009979026B2

(12) United States Patent
Chung et al.

(10) Patent No.: US 9,979,026 B2
(45) Date of Patent: *May 22, 2018

(54) NON-PRECIOUS METAL CATALYSTS PREPARED FROM PRECURSORS COMPRISING CYANAMIDE AND POLYANILINE

(71) Applicant: Los Alamos National Security, LLC, Los Alamos, NM (US)

(72) Inventors: Hoon Taek Chung, Los Alamos, NM (US); Piotr Zelenay, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 762 days.

This patent is subject to a terminal disclaimer.

(21) Appl. No.: 14/042,249

(22) Filed: Sep. 30, 2013

(65) Prior Publication Data
US 2014/0045098 A1  Feb. 13, 2014
US 2016/0351915 A9  Dec. 1, 2016

Related U.S. Application Data

(63) Continuation-in-part of application No. 13/239,109, filed on Sep. 21, 2011, now Pat. No. 9,169,140.
(Continued)

(51) Int. Cl.
*H01M 8/10* (2016.01)
*H01M 4/90* (2006.01)
(Continued)

(52) U.S. Cl.
CPC ....... *H01M 4/9008* (2013.01); *H01M 4/8668* (2013.01); *H01M 4/881* (2013.01);
(Continued)

(58) Field of Classification Search
CPC ............ H01M 4/9041; H01M 4/9083; H01M 4/9008; H01M 4/8668; H01M 4/8807;
(Continued)

(56) References Cited

U.S. PATENT DOCUMENTS 7,629,285 B2  12/2009  Popov et al.
8,518,608 B2  8/2013  Wu et al.
(Continued)

FOREIGN PATENT DOCUMENTS

KR    201 1 0 7 03    *  6/2011

OTHER PUBLICATIONS

Chung et al. "Synthesis and Evaluation of Heat-treated, Cyanamide-derived Non-precious Catalyst for Oxygen Reduction", ECS Trans., 25 (1) 485-492 (2009).*
(Continued)

*Primary Examiner* — Raymond Alejandro
(74) *Attorney, Agent, or Firm* — Lewis Roca Rothgerber Christie LLP

(57) ABSTRACT

A catalyst for oxygen reduction reaction (ORR) for a fuel cell was prepared by pyrolyzing a mixture of polyaniline, cyanamide, carbon black, and a non-precious metal salt under an inert atmosphere. The pyrolyzed product was treated to remove acid soluble components and then pyrolyzed again. The resulting powder was used to prepare a cathode for a membrane electrode assembly that was used in a fuel cell. When iron(III) chloride was used as the salt, the resulting catalyst was porous with a web-shaped structure. It displayed a maximum power density of 0.79 W/cm at 0.4 V in $H_2/O_2$ at 1.0 bar back pressure.

18 Claims, 11 Drawing Sheets

Related U.S. Application Data

(60) Provisional application No. 61/384,883, filed on Sep. 21, 2010, provisional application No. 61/408,129, filed on Oct. 29, 2010.

(51) Int. Cl.
    *H01M 8/1004*     (2016.01)
    *H01M 4/86*     (2006.01)
    *H01M 4/88*     (2006.01)

(52) U.S. Cl.
    CPC ....... *H01M 4/8807* (2013.01); *H01M 4/8828* (2013.01); *H01M 8/1004* (2013.01)

(58) Field of Classification Search
    CPC .. H01M 4/881; H01M 4/8828; H01M 4/1004; B01J 23/74; B01J 27/043; B01J 27/24
    See application file for complete search history.

(56) References Cited

U.S. PATENT DOCUMENTS

| | | |
|---|---|---|
| 9,169,140 B2 | 10/2015 | Chung et al. |
| 2003/0118890 A1* | 6/2003 | Wittpahl et al. ............... 429/44 |
| 2005/0287689 A1 | 12/2005 | Iwaki |
| 2007/0071987 A1 | 3/2007 | Winther-Nelson |
| 2010/0048380 A1* | 2/2010 | Calabrese Barton et al. .... 502/5 |
| 2010/0183950 A1 | 7/2010 | Dai |
| 2010/0276644 A1 | 11/2010 | Wolf |
| 2011/0281719 A1 | 11/2011 | Liu et al. |

OTHER PUBLICATIONS

Wu, Gang, et al. "Performance durability of polyaniline-derived non-precious cathode catalysts." ECS Transactions 25.1 (2009): 1299-1311.*
Becker et al., "Efficient access to bamboo-like carbon micro and nanofibers by pyrolysis of zinc cyanamide," J. Phys. and Chem. of Solids, 2001, vol. 62, pp. 1431-1433.
Becker et al., "Zinc cyanamide, Zn(Cn)2," Acta Crystallographica Section C., 2001, vol. 57, pp. 347-348.
Biddinger et al., "Effect of sulfur as a growth promoter for CNx nanostructures as PEM and DMFC ORR catalysts," Appl. Catal. B, 2010, vol. 96, pp. 72-82, available online Feb. 1, 2010.
Bonakdarpour et al., "Impact of loading in RRDE experiments on Fe—N—C catalysts: Two or four-electron oxygen reduction?," Electrochemical and Solid-State Letters, 2008, vol. 11, pp. B105-B108, available electronically Apr. 10, 2008.
Buckel et al., "Influence of Aromatic Groups Incorporated in Long-Chain Alkanethiol Self-Assembled Monolayers on Gold," Adv. Material, 2000, vol. 12, pp. 901-905.
Carrero-Sanchez et al., "Biocompatibility and Toxicological Studies of Carbon Nanotubes doped with Nitrogen," Nano Letters, 2006, vol. 6, No. 8, pp. 1609-1616.
Chokai et al., Preparation of carbon alloy catalysts for polymer electrolyte fuel cells from nitrogen-containing rigid-rod polymers, J Power Sources 195, 5947-5951, 2010.
Chung et al., "A Non-Precious Electrocatalyst for Oxygen Reduction Based on Simple Heat-Treated Precursors," ECS Trans., 2008, vol. 16, No. 2, pp. 385-391.
Chung et al., "Synthesis and Evaluation of Heat-Treated, Cyanamide-derived Non-precious Catalysts for Oxygen Reduction," ECS Trans., 2009, pp. 485-492.
Gong et al., "Nitrogen-Doped Ordered Carbon Nanotube Arrays with High Electrocatalytic Activity for Oxygen Reduction," Science, 2009, vol. 323, pp. 760-764.
Groenwolt et al., "Synthesis of g-C3N4 Nanoparticles in Mesoporous Silica Host Matrices," Adv. Mater., Jul. 2005, vol. 17, pp. 1789-1792.
Gupta et al., "Heat-treated polyacrylonitrile-based catalysts for oxygen electroreduction," J. Appl. Electrochem., 1989, vol. 19, pp. 19-27.
Hermann et al., "Influence of Sulfur on the Pyrolysis of CoTMPP as Electrocatalyst for the Oxygen Reduction Reaction," J. Electrochem. Soc., 2009, vol. 156, pp. B1283-B1292, published Aug. 27, 2009.
Jahnke et al., "Organic Dyestuffs as Catalysts for Fuel Cells," Top. Curr. Chem., 1976, vol. 61, pp. 133-181.
Jasinski, "A new Fuel Cell Cathode Catalyst," Nature, 1964, vol. 201, pp. 1212-1213.
Meng et al., "pH-Effect on Oxygen Reduction Activity of Fe-Based Electro-Catalysts," Electrochemistry Comm., 2009, vol. 11, pp. 1986-1989.
Nagaiah et al, "Nitrogen-Doped Carbon Nanotubes as Cathode Catalyst for Oxygen Reduction Reaction in Alkaline Medium," Electrochemistry Comm., 2010, vol. 12, pp. 338-341.
Pels et al., "Evolution of nitrogen functionalities in carbonaceous materials during pyrolysis," Carbon, 1995, vol. 33, pp. 1641-1653.
Schmidt et al., Oxygen electrocatalysis in alkaline electrolyte: PT(hkl), Au(hkl) and the effect of pd-modification, Electrochim Acta 47, 3765-3776, 2002.
Shanmugam et al., "Efficient Electrocatalytic Oxygen Reduction Over Metal Free-Nitrogen Doped Carbon Nanocapsules," Chem. Commun., 2011, vol. 47, pp. 4463-4465.
Strelko et al., "On the mechanism of possible influence of heteroatoms of nitrogen, boron and phosphorus in a carbon matrix on the catalytic activity of carbons in electron transfer reactions," Carbon, 2000, vol. 38, pp. 1499-1503.
Wiggins et al., "Effect of Nitrogen Concentration on Capacitance, Density of States, Electronic Conductivity, and Morphology of N-Doped Carbon Nanotube Electrodes," J. Phys. Chem. C., 2009, vol. 113, pp. 19082-19090.
Biddinger et al., "Role of Graphitic Edge Plane Exposure in Carbon Nanostructures for Oxygen Reduction Reaction," J. Phys. Chem. C, Sep. 2010, vol. 114, pp. 15306-15314.
Chung et al., "Cyanamide-derived non-precious metal catalyst for oxygen reduction," Electrochemistry Communications, vol. 12, Dec. 2010, pp. 1792-1795, available online Oct. 29, 2010.
Faubert et al., "Oxygen reduction catalysts for polymer electrolyte fuel cells from the pyrolysis of FeII acetate adsorbed on 3,4,9,10-perylenetetracarboxylic dianhydride," Electrochimica Acta, 1999, vol. 44, 2589-2603.
Gasteiger et al., "Activity benchmarks and requirements for Pt, Pt-alloy, and non-Pt oxygen reduction catalysts for PEMFCs," Applied Catalysis B: Environmental, Mar. 2005, vol. 56, pp. 9-35.
Jaouen, et al., "Recent advances in non-precious metal catalysis for oxygen reduction reaction in polymer electrolyte fuel cells," Energy Environ. Sci, 2011, vol. 4, pp. 114-130.
Jaouen et al., "Oxygen Reduction Catalysts for Polymer Electrolyte Fuel Cells from the Pyrolysis of Iron Acetate Adsorbed on Various Carbon Supports," J. Phys. Chem. B., Feb. 2003, vol. 107, pp. 1376-1386.
Jaouen et al., "Heat-Treated Re/N/C Catalysts for O2 Electroreduction: Are Active Sites Hosted in Micropores?," J. Phys. Chem. B, Mar. 2006, vol. 110, pp. 5553-5558.
Jaouen et al., "Cross-Laboratory Experimental Study of Non-Noble-Metal Electrocatalysts for the Oxygen Reduction Reaction," Aug. 2009, vol. 1, pp. 1623-1639.
Koslowski et al., "Nature of the Catalytic Centers of Porphyrin-Based Electrocatalysts for the ORR: A Correlation of Kinetic Current Density with the Site Density of Fe-N4 Centers," J. Phys. Chem. C., Oct. 2008, vol. 112, pp. 15356-15366.
Lefevre et al., "Iron-Based Catalysts with Improved Oxygen Reduction Activity in Polymer Electrolyte Fuel Cells," Science, vol. 324, Apr. 2009, pp. 71-74.
Lefevre et al., "Molecular Oxygen Reduction in PEM Fuel Cells: Evidence for the Simultaneous Presence of Two Active Sites in Fe-Based Catalysts," J. Phys. Chem. B, 2002, vol. 106, pp. 8705-8713, published on web Jul. 27, 2002.
M. Lefevre et al., "Molecular Oxygen Reduction in PEM Fuel Cell Conditions: ToF-SIMS Analysis of Co-Based Electrocatalysts," J. Phys. Chem. B, Sep. 2005, vol. 109, pp. 16718-16724.
Maldonado et al., "Influence of Nitrogen Doping on Oxygen Reduction Electrocatalysis at Carbon Nanofiber Electrodes," J. Phys. Chem. B, Mar. 2005, vol. 109, pp. 4707-4716.

(56) References Cited

OTHER PUBLICATIONS

Matter et al., "Non-metal Catalysts for Dioxygen Reduction in an Acidic Electrolyte," Catalysis Letters, Jul. 2006, vol. 109, pp. 115-123.

Nallathambi et al., "Development of high performance carbon composite catalyst for oxygen reduction reaction in PEM Proton Exchange Membrane fuel cells," Journal of Power Sources, vol. 183, Aug. 15, 2008, pp. 34-42, available online May 2008.

Niwa et al., "X-ray absorption analysis of nitrogen contribution to oxygen reduction reaction in carbon alloy cathode catalysts for polymer electrolyte fuel cells," J. Power Sources, Feb. 2009, vol. 187, pp. 93-97.

Oh, et al., "Corrosion resistance and sintering effect of carbon supports in polymer electrolyte membrane fuel cells," Electrochim. Acta, 2009, vol. 54, pp. 6515-6521.

Qu, et al., "Nitrogen-Doped Graphene as Efficient Metal-Free Electrocatalyst for Oxygen Reduction in Fuel Cells," ACSNANO, 2010, vol. 4, No. 3, pp. 1321-1326.

H. Schulenburg et al., "Catalysts for the Oxygen Reduction from Heat-Treated Iron(III) Tetramethoxyphenylporphyrin Chloride: Structure and Stability of Active Sites," J. Phys. Chem. B., Aug. 2003, vol. 107, pp. 9034-9041.

Shao, et al., "Novel catalyst support materials for PEM fuel cells: current status and future prospects," J. Mater. Chem., Nov. 2008, vol. 19, pp. 46-59.

Shao, et al., "Understanding and approaches for the durability issues of Pt-based catalysts for PEM fuel cell," J. Power Sources, 2007, vol. 171, pp. 558-566, available online Jul. 10, 2007.

Sidik et al., "O2 Reduction on Graphite and Nitrogen-Doped Graphite: Experiment and Theory," J. Phys. Chem. B., Feb. 2006, vol. 110, pp. 1787-1793.

Tributsch et al., "Experimental and theoretical modeling of Fe-, Co-, Cu-, Mn-based electrocatalysts for oxygen reduction," Electrochemica Acta, vol. 53, Jan. 2008, pp. 2198-2209 (available online Sep. 2007).

Wang, et al., "Effect of the Pre-Treatment of Carbon Black Supports on the Activity of Fe-Based Electrocatalysts for the Reduction of Oxygen," J. Phys. Chem. B, Mar. 1999, vol. 103, pp. 2042-2049.

Wood et al., "Non-precious metal oxygen reduction catalyst for PEM fuel cells based on nitroaniline precursor," J. Power Sources, Apr. 2008, vol. 178, pp. 510-516.

Wu, et al., "Pt-free cathode catalysts prepared via multi-step pyrolysis of Fe phthalocyanine and phenolic resin for fuel cells," Chem. Commun., May 27, 2010, vol. 46, pp. 6377-6379.

Wu, et al., "Polyaniline-derived non-Precious Catalyst for the Polymer Electrolyte Fuel Cell Cathode," ECS Transactions, 2008, vol. 2, No. 16, pp. 159-170.

Wu, et al., "Performance Durability of Polyaniline-derived non-Precious Cathode Catalysts," ECS Transactions, 2009, vol. 1, No. 25, pp. 1299-1311.

Wu, et al., "Titanium dioxide-supported non-precious metal oxygen reduction electrocatalyst," Chem. Commun., 2010, vol. 46, pp. 7489-7491.

Wu, et al., "Nitrogen-doped magnetic onion-like carbon as support for Pt particles in a hybrid cathode catalyst for fuel cells," Journal of Materials Chem., 2010, vol. 20, pp. 3059-3068.

Wu et al., "High Performance Electrocatalysts for Oxygen Reduction Derived from Polyaniline, Iron, and Cobalt," Science, Apr. 2011, vol. 332, pp. 443-447.

Liu et al., "Nitrogen-Doped Ordered Mesoporous Graphitic Arrays with High Electrocatalytic Activity for Oxygen Reduction," Angew. Chem. Int. Ed., 2010, vol. 49, pp. 2565-2569.

Yang, et al., "Efficient Metal-Free Oxygen Reduction in Alkaline Medium on High-Surface-Area Mesoporous Nitrogen-Doped Carbons Made from Ionic Liquids and Nucleobases," J. Am. Chem. Soc. 2011, 133(2):206-209, available online Dec. 14, 2010.

U.S. Appl. No. 13/239,109 Final Office Action dated Aug. 22, 2014.
U.S. Appl. No. 13/239,109 Office Action dated Apr. 2, 2014.

\* cited by examiner

NON-PRECIOUS METAL CATALYSTS PREPARED FROM PRECURSORS COMPRISING CYANAMIDE AND POLYANILINE

RELATED APPLICATIONS

This application is a continuation-in-part of U.S. application Ser. No. 13/239,109 entitled "Non-Precious Metal Catalysts," filed Sep. 21, 2011, which claimed the benefit of U.S. Provisional Application No. 61/384,883 entitled "Non-Precious Metal Catalysts" filed Sep. 21, 2010 and U.S. Provisional Application No. 61/408,129 entitled "Non-Precious Metal Catalysts" filed Oct. 29, 2010, all incorporated by reference herein.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to non-precious metal catalysts suitable for use in fuel cells and in particular to non-precious metal catalysts comprising a metal, a nitrogen source combination of cyanamide (CM) and polyaniline (PANI), and a carbon source.

BACKGROUND OF THE INVENTION

Fuel cells are suited for transportation vehicles because of their fast startup time, low sensitivity to orientation, and favorable power-to-weight ratio. Relatively low temperature operation at around 80° C. makes fast startup possible. Scarce, expensive platinum-based catalysts are needed for the oxygen reduction reaction (ORR) at the cathode of these fuel cells.

A need exists for less expensive catalysts that exhibit a catalytic activity similar to that for platinum-based metal catalysts.

Metal-nitrogen-carbon (M-N—C) type catalysts having non-precious metals have been studied for almost 50 years since the discovery of their ORR activity in macrocycles bound with non-precious metals. These M-N—C type catalysts are currently considered to be promising alternatives to platinum-based catalysts in fuel cells. M-N—C type catalysts that are iron-based, for example, are currently being investigated as possible alternatives to platinum-based cathode catalysts. For example, Lefèvre et al. in "Iron-Based Catalysts with Improved Oxygen Reduction Activity in Polymer Electrolyte Fuel Cells, Science, April 2009, vol. 324, pp. 71-74, incorporated by reference, reported the preparation of various iron-based M-N—C type catalysts for ORR. Lefèvre et al. identified the following factors for producing active Fe-based catalysts for ORR: (1) disordered carbon content in the catalyst precursor, (2) iron, (3) surface nitrogen, and (4) micropores in the catalyst. Lefèvre et al., noted targets set by the U.S. Department of Energy of 130 A/cm$^3$ by 2010 and 300 A/cm$^3$ by 2015 for volumetric activity as measured in a fuel cell at 0.8 V iR-free cell voltage (i.e. after correction for ohmic loss R) at 80° C., and at $O_2$ and $H_2$ absolute pressures of 1 bar and 100% relative humidity. According to Lefèvre et al., volumetric activity is a meaningful measure of activity because the product of volumetric activity with electrode thickness predicts the kinetic current density (in A/cm$^2$) of the cathode. FIG. 1, taken from Lefèvre et al. is a plot of iR-free cell voltage vs. volumetric current density, including volumetric current density of their best (solid circle, 99 A/cm$^3$) non-precious metal catalyst (NPMC). The original polarization curves of Lefèvre et al. were obtained from $H_2$—$O_2$ fuel cell tests at 80° C. and 100% relative humidity (smaller open circles represent $PO_2$=$PH_2$=1.5 bar). The smaller open diamonds are for data obtained for a catalyst reported by Wood et al., "Non-precious metal oxygen reduction catalyst for PEM fuel cells based on nitroaniline precursor," J. Power Sources, 2008, vol. 178, pp. 510-516, incorporate by reference. FIG. 1 also shows corrected polarization curves (larger circles and larger diamonds) that are based on the DOE fuel cell test reference conditions (vide supra).

SUMMARY OF THE INVENTION

Expensive platinum-based catalysts are currently used for both anode catalysts and cathode catalysts in fuel cells. Platinum is used for oxygen reduction in the cathode side due to the high overpotential. Replacing an expensive platinum-based catalyst with a less expensive material would have a tremendous impact on one of the main obstacles to commercializing PEMFCs, namely the high cost of precious metals. Embodiments described herein include iron-based catalysts that are suitable for ORR in fuel cells.

An embodiment catalyst was prepared by a process that includes heating a mixture of an iron salt, cyanamide (CM), polyaniline (PANI), and carbon black at a temperature in a range of from about 700° C. to about 1100° C. under an inert atmosphere, and removing acid soluble components from the mixture.

An embodiment electrode includes a catalyst prepared by heating a mixture of an iron salt, CM, PANI, and carbon black at a temperature of from about 700° C. to about 1100° C. under an inert atmosphere and thereafter removing acid soluble components from the mixture and thereafter heating the mixture from about 700° C. to about 1100° C. under an inert atmosphere to form the catalyst; mixing the catalyst with water and with an ionomer suspension to form a catalyst composition; applying the catalyst composition onto a first side of a membrane; applying the catalyst composition onto a first side of a gas diffusion layer; forming a membrane electrode assembly by placing the first side of the membrane in direct contact with the first side of the gas diffusion layer; and applying heat and pressure.

An embodiment fuel cell includes a catalyst prepared by a process that includes heating a mixture of an iron salt, CM, PANI, and carbon black at a temperature in a range of from about 700° C. to about 1100° C. under an inert atmosphere, and removing acid soluble components from the mixture.

Total nitrogen content was obtained from the sum of pyridinic, pyrrolic, and graphitic nitrogen content.

Figure 3A:
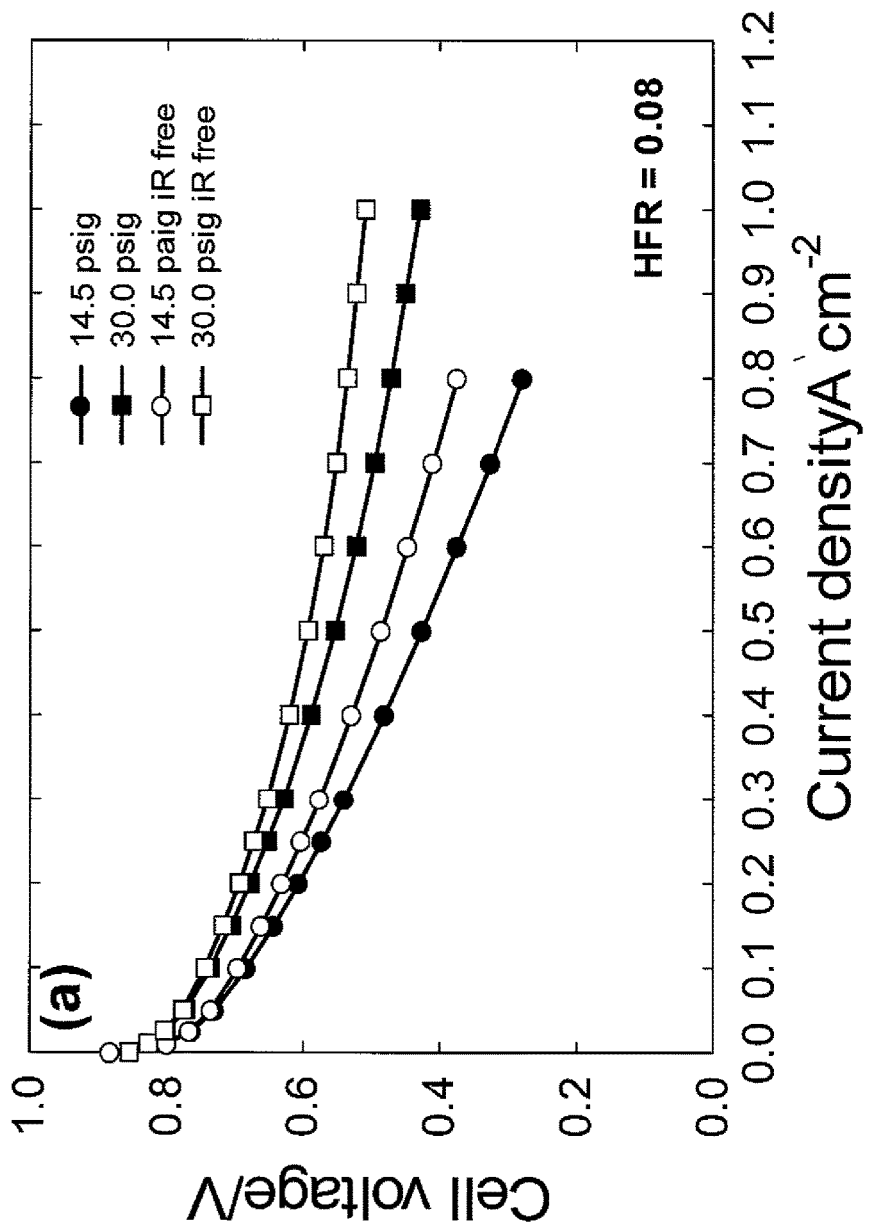
Figure 3B:
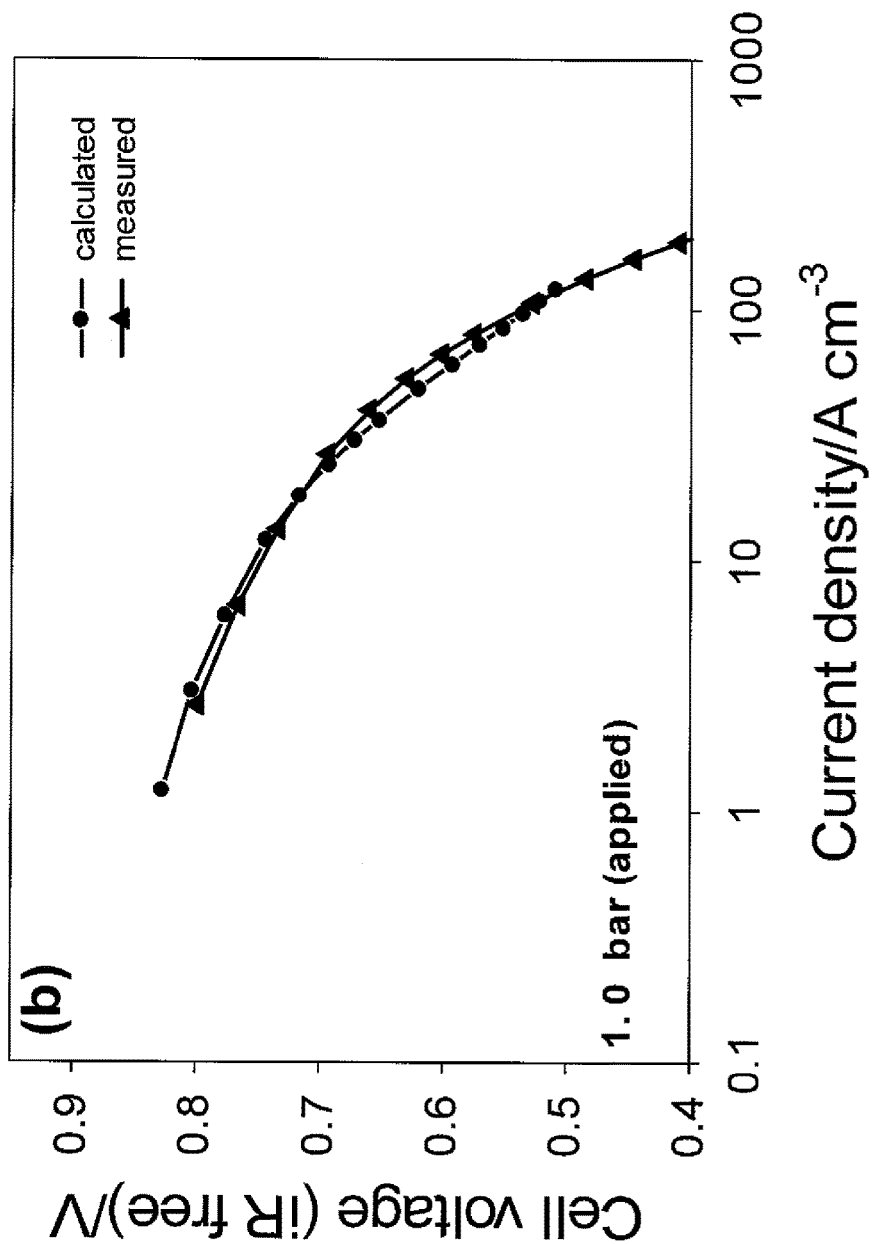

FIG. 3a shows fuel cell performance as plots of fuel cell polarization at different backpressures for a $FeCl_3$-PANI-Ketjenblack ORR catalyst, and FIG. 3b shows plots comparing measured (filled triangles) vs. calculated (filled circles) volumetric activities of the catalyst. The name $FeCl_3$-PANI-Ketjenblack refers to the materials iron(III) chloride, polyaniline, and a carbon black, which were used to prepare the catalyst, and ORR refers to Oxygen Reduction Reaction.

Figure 4A:
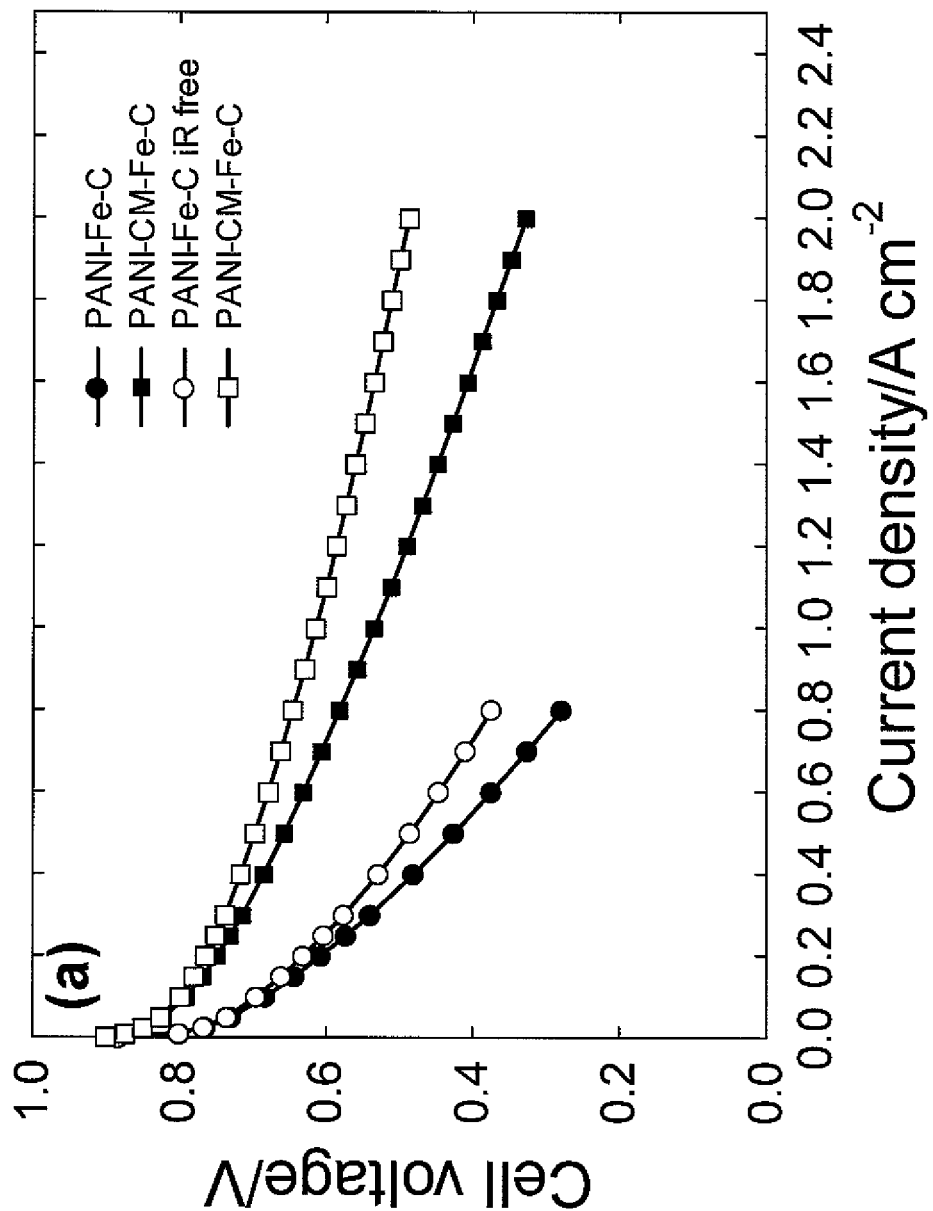
Figure 4B:
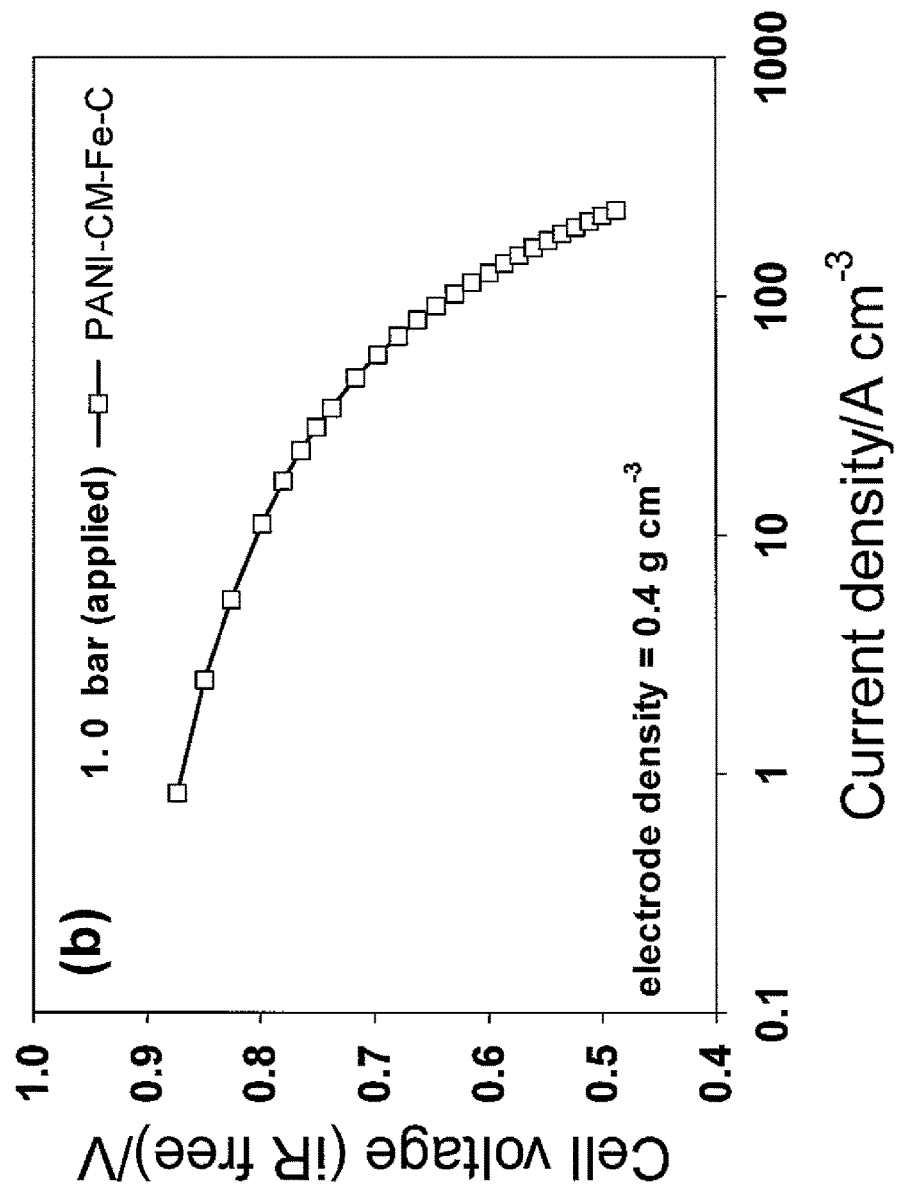

FIG. 4a compares fuel cell performance of a $FeCl_3$-CM-PANI-Ketjenblack ORR catalyst cathode with a $FeCl_3$-PANI-Ketjenblack ORR catalyst cathode, and FIG. 4b shows volumetric activity of the $FeCl_3$-CM-PANI-Ketjenblack cathode.

Figure 5B:
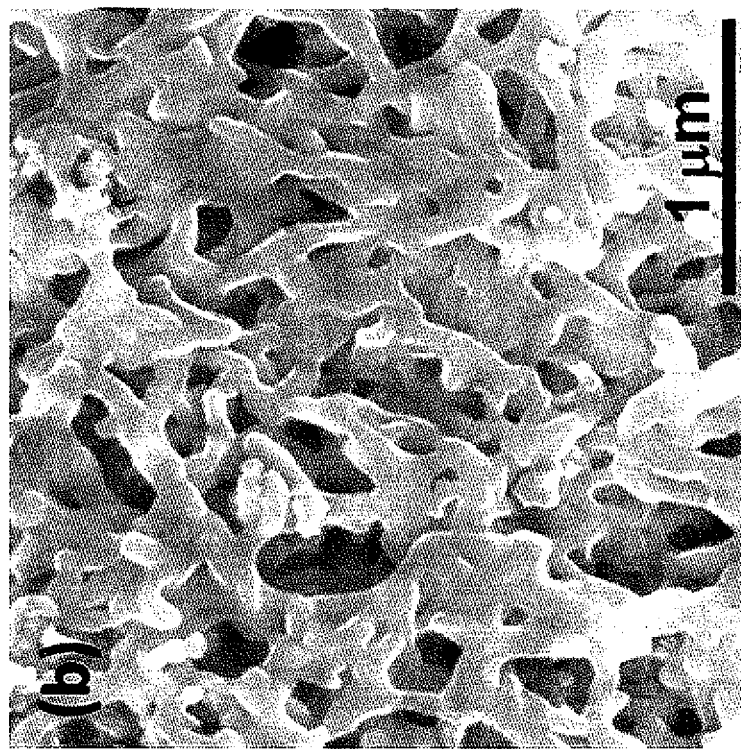
Figure 5A:
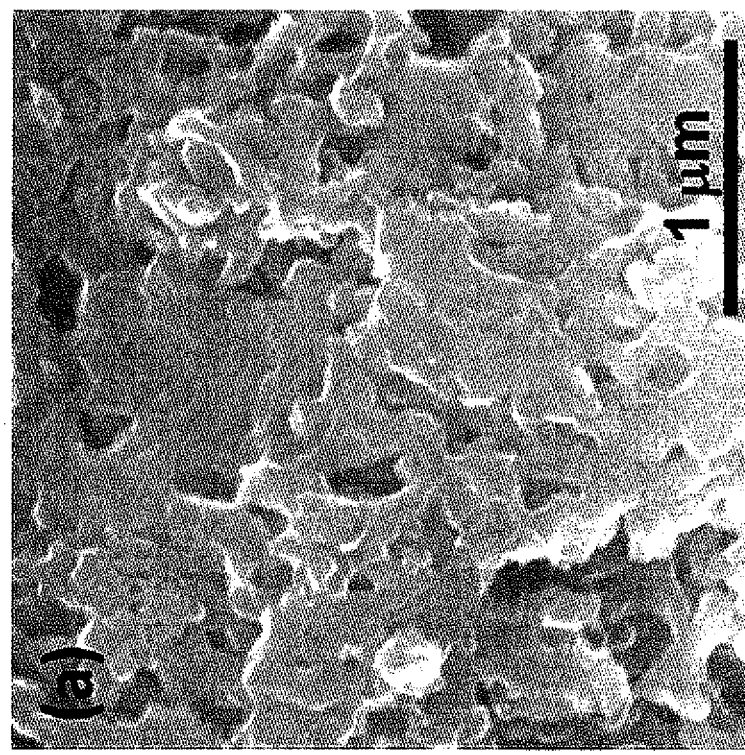

FIG. 5a shows a scanning electron micrograph (SEM) of a $FeCl_3$-PANI-CM-Ketjenblack catalyst, and FIG. 5b shows a SEM of a $FeCl_3$-CM-PANI-Ketjenblack catalyst which has a webbed structure.

Figure 6A:
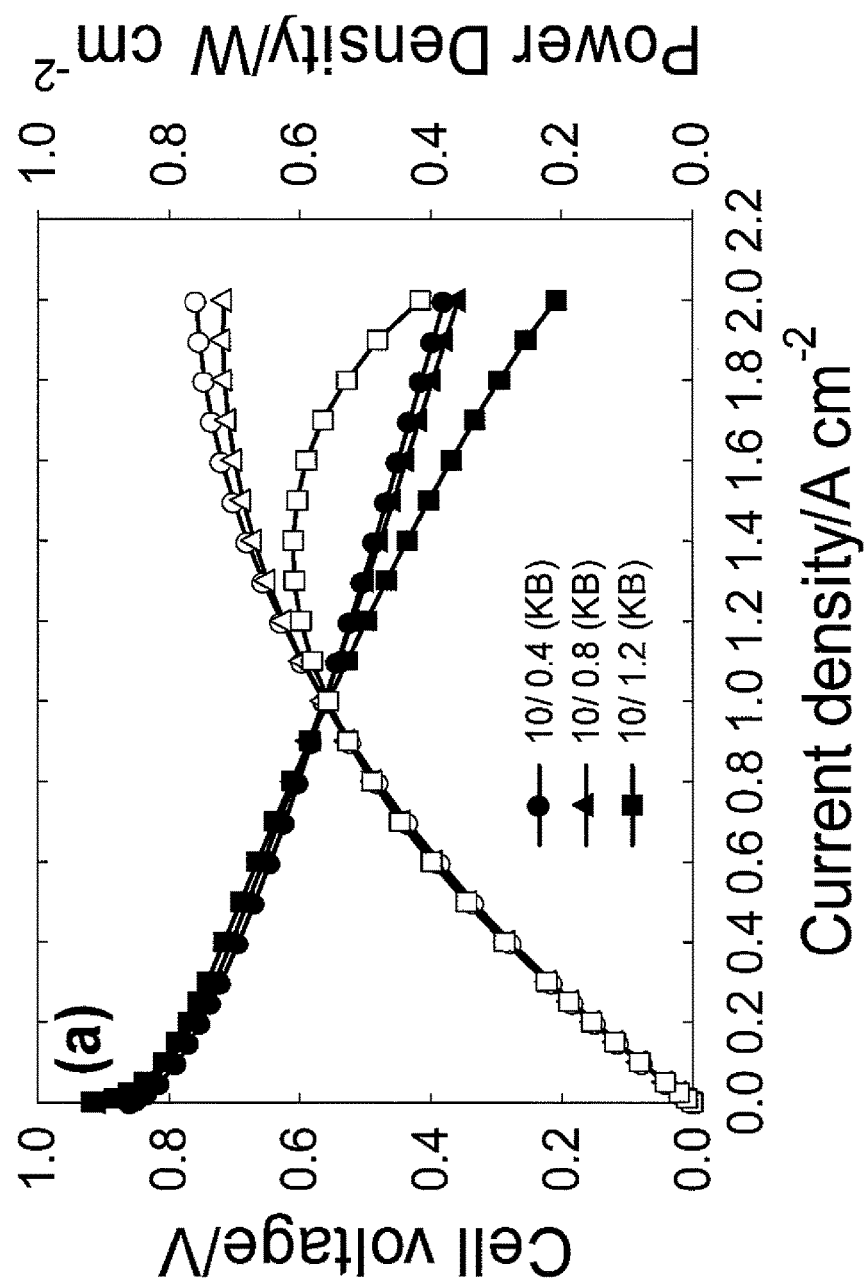
Figure 6B:
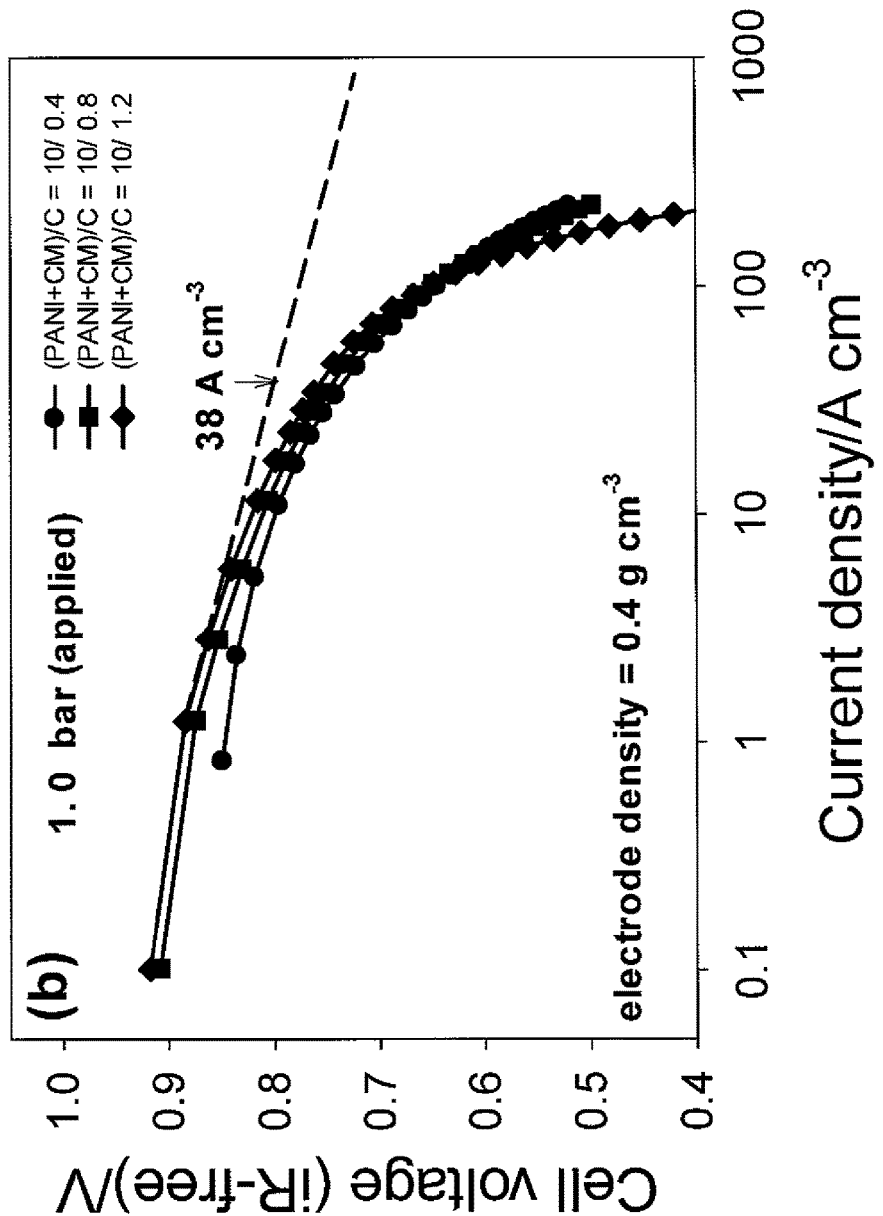

FIGS. 6a and 6b show plots related to fuel cell testing of $FeCl_3$-CM-PANI-Ketjenblack catalysts with different ratios of (CM+PANI)/Ketjenblack. FIG. 6a shows plots of fuel cell polarization with power density appearing on the right axis, and FIG. 6b shows volumetric activities.

Figure 7A:
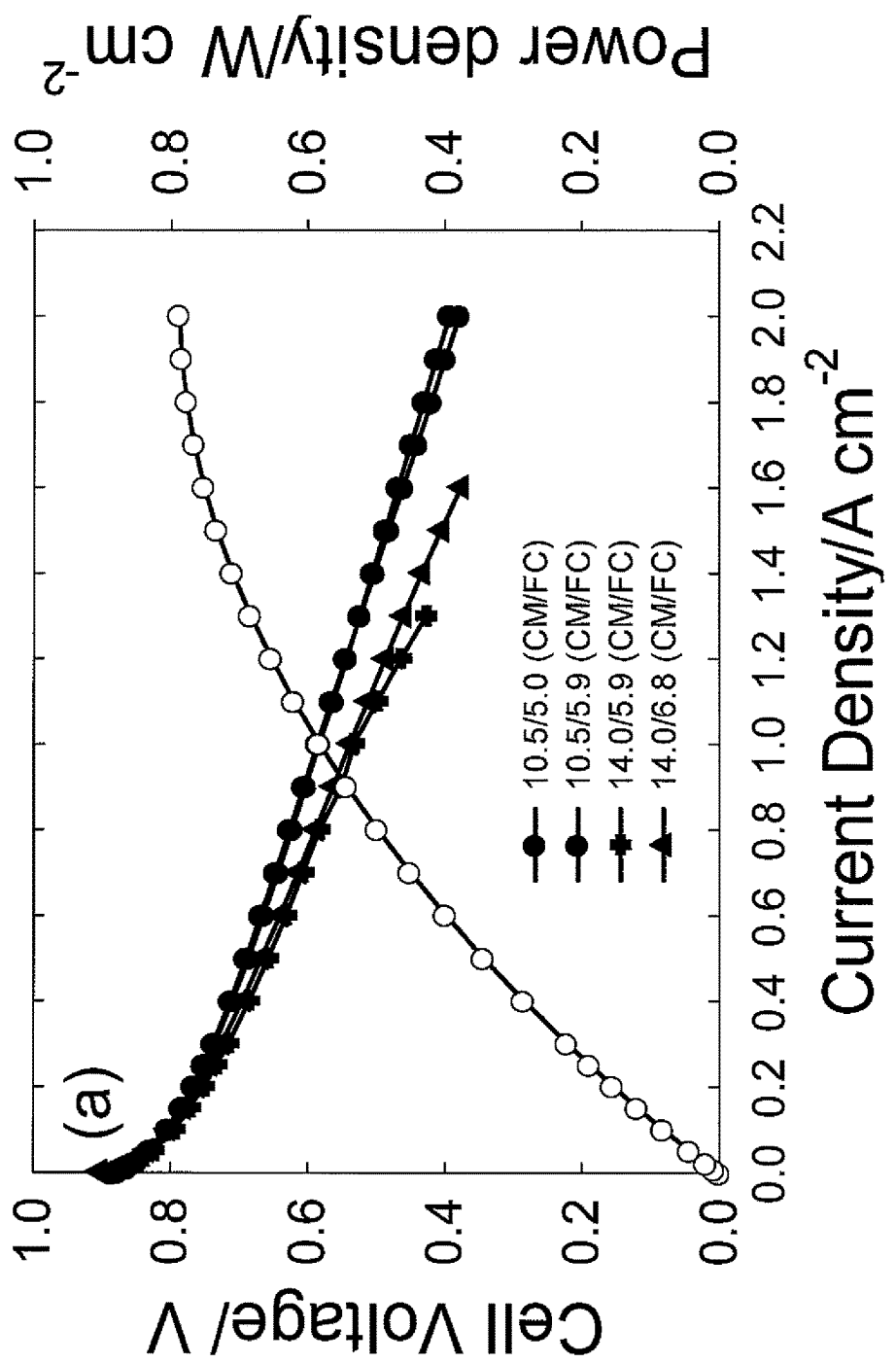
Figure 7B:
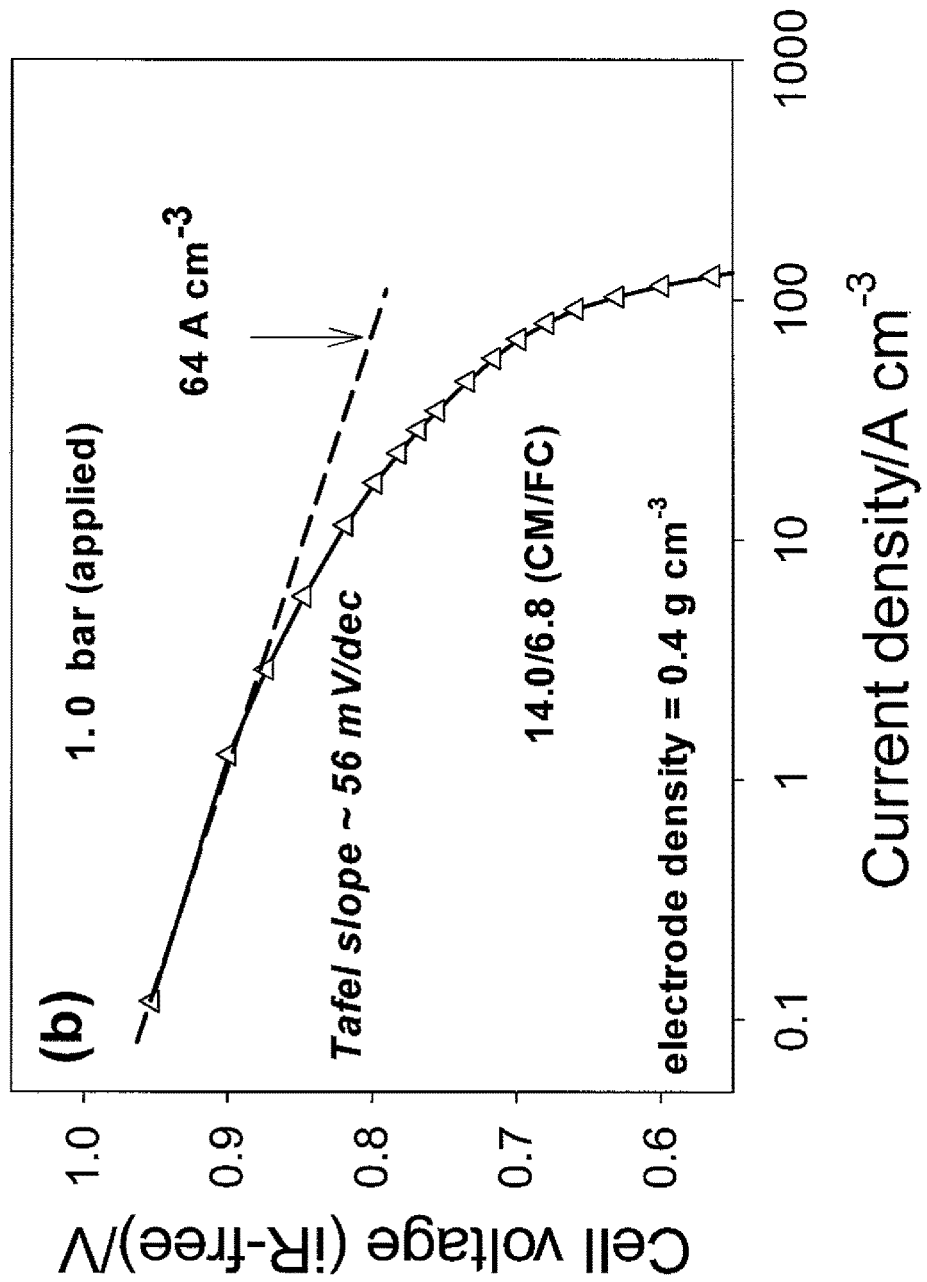

FIGS. 7a and 7b show plots related to fuel cell testing of $FeCl_3$-CM-PANI-Ketchenblack catalysts with different ratios of $CM/FeCl_3$. FIG. 7a shows a volumetric activity of 64 A/cm$^3$ for a catalyst having a $CM/FeCl_3$ ratio of 14.0/6.8. For a catalyst having $CM/FeCl_3$ ratio of 10.5/5.0, a Tafel slope shown in FIG. 7b was 64 A/cm$^3$. An embodiment catalyst having a $CM/FeCl_3$ ratio of 10.5/5.0 gave a power density of 0.79 W/cm$^2$ at 0.4 volts (V); this value exceeds the highest reported value thus far, to our knowledge, of power density for a non-precious metal catalyst (0.56 W/cm$^2$ at approximately 1.5 bar).

DETAILED DESCRIPTION

Embodiment ORR catalyst compositions were synthesized using a nitrogen source combination of polyaniline and cyanamide. Typically, an oxidant was combined with solution that included both aniline and cyanamide. The oxidant caused polymerization of the aniline to polyaniline. A typical synthesis of an embodiment catalyst involves combining a non-precious metal salt (an iron salt, a cobalt salt, a manganese sale, or a combination of two of these salts, or a combination of all three salts) such as an iron salt (an iron halide salt such as $FeBr_3$ or $FeCl_3$, for example), aniline, and cyanamide with an aqueous solution of hydrochloric acid. Other types of salts that fall within the scope of this invention include metal acetates, metal sulfates, and metal phosphates. The combination of the non-precious metal salt, aniline, cyanamide, and aqueous hydrochloric acid produces a solution. An oxidant is added (ammonium persulfate, for example) to the solution. The oxidant causes polymerization of the aniline to polyaniline. A pretreated carbon black is then added. The resulting mixture is heated until a powder is produced. The powder is ground and then pyrolyzed at a temperature in a range from 700° C. and 1100° C. The pyrolyzed powder is treated with sulfuric acid solution to remove acid soluble components, and afterward, washed, dried, and pyrolyzed again. One or more of these steps is performed with stirring and/or under a nitrogen atmosphere. The resulting composition is a non-precious metal based, M-N—C type catalyst that is suitable for use in fuel cells. A non-limiting example of an embodiment catalyst is referred to herein as a $FeCl_3$-CM-PANI-Ketjenblack catalyst. CM is the acronym for cyanamide and PANI is the acronym for polyaniline. The nomenclature for the embodiment $FeCl_3$-CM-PANI-Ketjenblack catalyst is used to represent the materials used to prepare the embodiment catalyst.

An embodiment $FeCl_3$-CM-PANI-Ketjenblack catalyst was prepared as follows: 3.0 ml aniline and 7.0 ml cyanamide (CM) were added into 500 ml of 1.0M HCl with stirring by a magnetic bar. 5.0 g $FeCl_3$ were dissolved in the aniline solution. 5.0 g of the oxidant $(NH_4)_2S_2O_8$ (ammonium persulfate APS) were added and the resulting solution was stirred vigorously at room temperature for 4 hours, which allowed the aniline to polymerize to form PANI. Separately, and in advance of the above polymerization, 0.4 g of carbon (Ketjenblack EC-300J) was pretreated with 70% nitric acid at 80° C. for 8 hours. The pretreated Ketjenblack was ultrasonically dispersed for 1 hour in 40 ml of 1.0 M HCl solution. The resulting Ketjenblack-containing dispersion was mixed into the polymerization reaction. The resulting mixture was stirred for 48 hours, and then heated at 90° C. on a hot plate with stirring by magnetic bar. As the mixture heated, the liquid evaporated. The resulting dry powder was ground using a mortar and pestle. The ground powder was pyrolyzed at 900° C. in a nitrogen atmosphere for 1 hour. The pyrolyzed powder was ground by a mortar and pestle and approximately 1 gram of the powder was subsequently pre-leached in 150 ml of 0.5 M $H_2SO_4$ at 80-90° C. for 8 hours, and washed thoroughly with 1 liter of deionized water. After drying at 100° C. in a vacuum overnight, the dried powder was pyrolyzed at 900° C. in a nitrogen atmosphere for 3 hours. The result was a $FeCl_3$-CM-PANI-Ketjenblack catalyst.

Another M-N—C type ORR catalyst was prepared using the above process but without adding the CM. An example of this catalyst is referred to herein as $FeCl_3$-PANI-Ketjenblack. An example of $FeCl_3$-PANI-Ketjenblack was prepared as follows: 3.0 ml aniline was added into 500 ml of 1.0M HCl solution with stirring by a magnetic bar. 5.0 g $FeCl_3$ was dissolved in the aniline solution, and then 5.0 g $(NH_4)_2S_2O_8$ (ammonium persulfate, APS) as oxidant was added into the solution to polymerize the aniline. The solution was stirred vigorously at room temperature for 4 hours to allow the aniline to polymerize. Separately, and in advance of the above polymerization, 0.4 g of carbon (Ketjenblack EC-300J) pretreated with 70% nitric acid at 80° C. for 8 hours was ultrasonically dispersed for 1 hour in 40 ml of 1.0 M HCl solution in advance, and mixed with the above polymerized solution. After 48 hours of stirring, the mixture was dried at 90° C. on a hot plate with stirring by magnetic bar. As the mixture was heating, the liquid evaporated. The resulting dried powder was ground by a mortar and pestle and then pyrolyzed at 900° C. in nitrogen atmosphere for 1 hour. The pyrolyzed powder was ground up by a mortar and pestle. Approximately 1 gram of the ground up powder was pre-leached in 150 ml of 0.5 M $H_2SO_4$ at 80-90° C. for 8 hours, and washed thoroughly with 1 liter of deionized water. After drying at 100° C. in a vacuum overnight, the dried powder was pyrolyzed at 900° C. in a nitrogen atmosphere for 3 hours. The result is a $FeCl_3$-PANI-Ketjenblack catalyst.

Inks of the catalysts for fuel cells were prepared. An embodiment ink was prepared by combining a small amount of catalyst, a small amount of ionomer solution (e.g. 5% solution of NAFION®), isopropanol, and deionized water. The relative amounts by weight for a non-limiting embodiment ink were catalyst:isopropanol:deionized water:5% NAFION® solution=1:12:12:11. These ingredients were mixed ultrasonically for 1 hour. NAFION® is a commercially available material that is a copolymer of a perflurorsulfonic acid and a polytetrafluoroethylene.

An embodiment ink for a rotation disk electrode (RDE) was prepared by ultrasonically blending 10 milligrams (mg) of catalyst, approximately 30 mg of 5% NAFION® in alcohol (SOLUTION TECHNOLOGY, INC), and 2.5 ml of aqueous isopropanol (by volume: 4 parts isopropanol to 1 part deionized water). The catalyst to ionomer ratio of the ink was approximately 0.15. Pipetting 30 microliters of the ink onto a 0.196 $cm^2$-disk gave a loading of 0.6 mg/$cm^2$. For 0.247 $cm^2$-disk, 30 microliters of the ink were pipetted.

Another embodiment ink for a RDE was prepared by ultrasonically blending 20 mg of catalyst, and approximately 60 mg of 5% NAFION® in alcohol (SOLUTION TECHNOLOGY, INC) in 2.0 ml isopropanol. Pipetting 12 microliters onto a 0.196 $cm^2$-disk (15 microliters onto a 0.247 $cm^2$-disk) gave a loading of 0.6 mg/$cm^2$.

Electrodes (e.g. cathodes) were prepared from the inks. An embodiment cathode was prepared by applying (by brushing, for example) ink to a side of a membrane, and applying ink to a side of a gas diffusion layer (GDL). The ink was applied until a catalyst loading of approximately 3.5 mg/$cm^2$ was obtained. The inked sides of the membrane and GDL were pressed together and the resulting assembly was heated. This procedure resulted in an electrode that may be used as a cathode of a membrane electrode assembly.

The anodes of embodiment membrane electrode assemblies were commercially available Pt-based anodes. An embodiment membrane electrode assembly included an anode of Pt-catalyzed cloth gas-diffusion layer having a loading of 0.5 milligrams of Pt per square centimeter, available from E-TEK.

Embodiment membrane electrode assemblies were prepared by hot pressing a cathode and an anode onto a membrane that was a copolymer of a perfluorosulfonic acid and a polytetrafluoroethylene. Such membranes are commercially available under the name NAFION®. An embodiment membrane assembly was prepared by, for example, hot-pressing a cathode and anode onto a NAFION 212 membrane at 125° C. for 3 minutes. The geometric area of the membrane electrode assembly was 5.0 $cm^2$.

Fuel cells were assembled using the embodiment membrane electrode assemblies. The activities of the embodiment ORR catalysts in these fuel cells were measured. Rotating disk electrode (RDE) and rotating disk-ring electrode (RRDE) measurements were performed using a CHI Electrochemical Station (Model 750b) in a standard three electrode cell. For RDE, 5 mm diameter glassy carbon disks (geometric area: 0.196 $cm^2$) were used. For RRDE, 5.61 mm diameter glassy carbon disks (geometric area 0.247 $cm^2$) with a platinum ring were used. To avoid any potential contamination of the N-M-C catalyst by platinum, all experiments for the N-M-C catalysts were carried out with a graphite rod as the counterelectrode. The reference electrode was (Ag/AgCl (in 3M NaCl)). The reference electrode was calibrated against a reversible hydrogen electrode (RHE).

Fuel cell testing was carried out in a single cell with single serpentine flow channels. Pure hydrogen and air/oxygen, humidified at 80° C., were supplied to the anode and cathode at a flow rate of 200 and 600/200 mL/min, respectively. The backpressures at both electrodes were changed from 0 to 30 psig. Fuel cell polarization plots were recorded using standard fuel cell test stations (Fuel Cell Technologies, Inc.) at current control mode.

Catalyst morphology was characterized by scanning electron microscopy (SEM) using a Hitachi S-5400 instrument. High-resolution transmission electron microscopy (HR-TEM) images were taken on a JEOL 2010 microscope operating at 200 kV. X-ray photoelectron spectroscopy (XPS) measurements were performed on a Physical Electronics VersaProbe XPS System using monochromatic Al Kα line (1486.6 eV) as an X-ray source at UTRC. The background was subtracted from all the experimental data presented herein. Surface area of the samples was measured by Quantachrome Autosorb-iQ using $N_2$.

Figure 1:
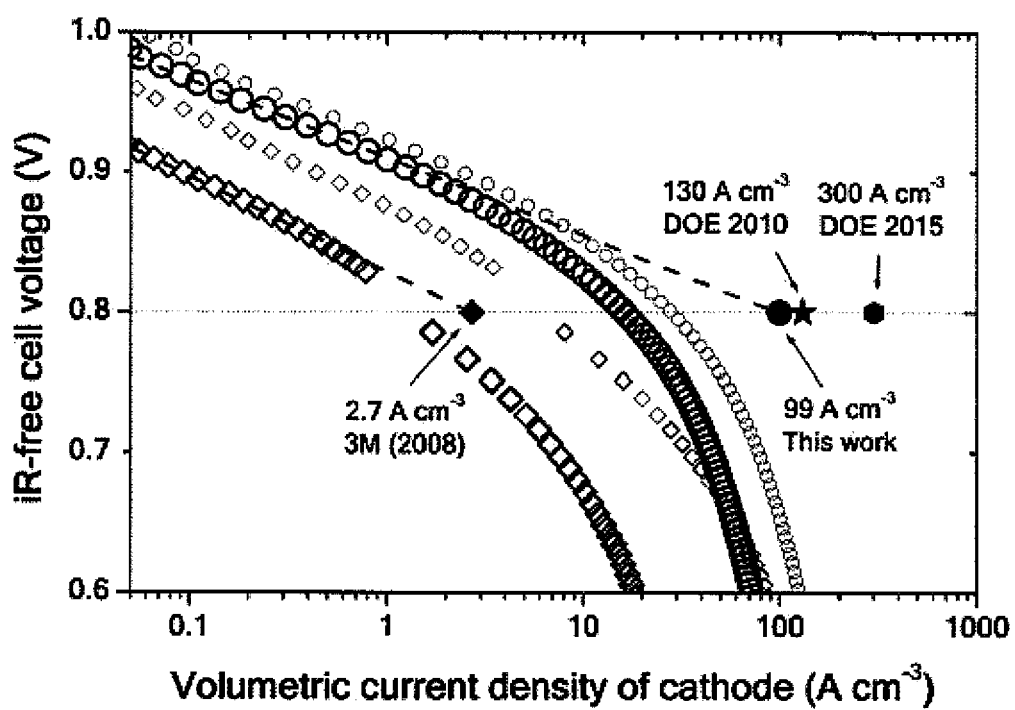
FIG. 1 shows a plot taken from Lefèvre et al. of iR-free cell voltage vs. volumetric current density, including volumetric current density of their best (solid circle, 99 A/cm$^3$) non-precious metal catalyst (NPMC).
Figure 2:
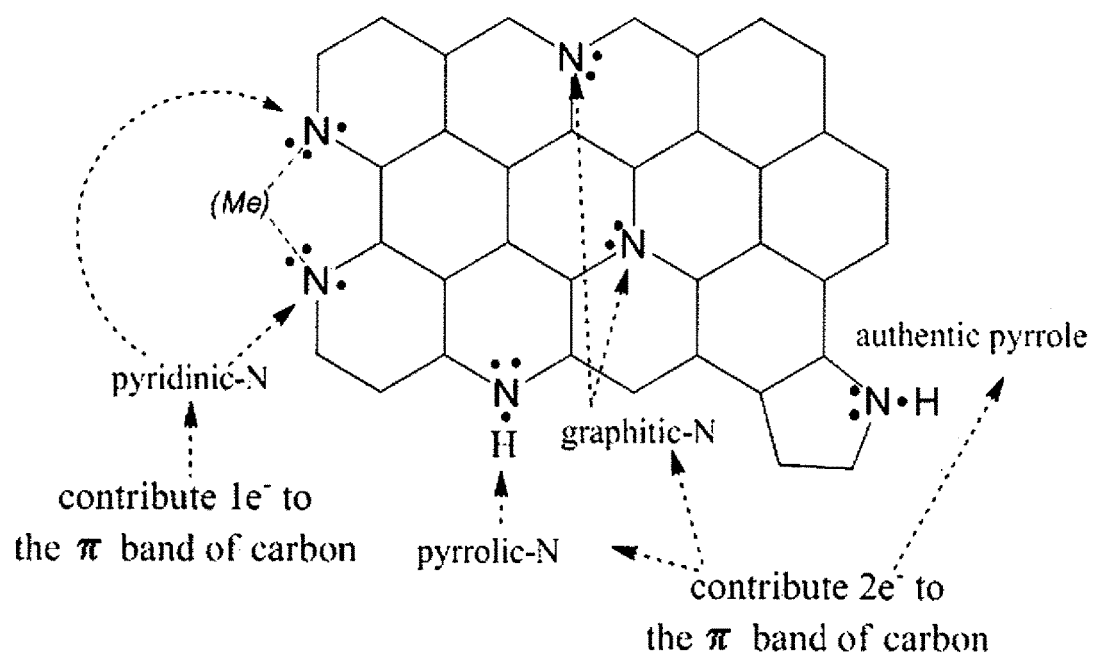
FIG. 2 shows a schematic diagram of pyridinic, pyrrolic, graphitic, and authentic pyrrole nitrogen incorporated into the graphene carbon layer. Pyridinic nitrogen contributes 1 electron to the π band of carbon, while pyrrolic, graphitic, and authentic pyrrole nitrogen contributes two electrons.

According to previous reports, the nitrogen content and type present in M-N—C catalysts is important for ORR activity. As depicted in FIG. 2, there are several types of nitrogen species that can be largely classified as "two p electrons donor" (to the pi-band of carbon) and "one p electron donor" (to the pi-band of carbon). The two p electrons donor species (especially graphitic and pyrrolic-N) are expected to lower the carbon band gap energy and possibly promote catalytic activity. The one p electron donor (pyridinic-N) specie also has a lone pair of electrons available for binding with metal atoms; indeed, this pyridinic nitrogen content has been the most closely correlated to the activities of M-N—C catalysts.

FIG. 3a shows fuel cell polarization plots of cell voltage in volts versus current density in amperes per square centimeter for a $FeCl_3$-PANI-Ketjenblack cathode catalyst with various applied backpressures. The bottom curve which includes filled circles shows data plotted for a backpressure of 14.5 psig, the curve above it which includes empty circles is iR-corrected for this backpressure. The next curve which includes filled squares shows data plotted for a backpressure of 30 psig, and the topmost curve which includes empty squares is iR-corrected for this backpressure. The curves show that the activity of the embodiment catalyst decreases with decreasing back pressure. FIG. 3b plots measured and calculated volume activity of the same catalyst. There was little difference between the measured and calculated values. The measured volumetric activity for the catalyst at 0.8 V (iR-corrected) 1.0 bar (applied) was 3 A/$cm^3$.

FIG. 4a provides fuel cell polarization curves of cell voltage in volts versus current density for a $FeCl_3$-CM-PANI-Ketjenblack catalyst. The volumetric activity at 0.8 V (iR-corrected) of the embodiment catalyst measured at 1.0 bar (applied) was 10 A/$cm^3$ (see FIG. 3b).

XPS results show a higher pyridinic nitrogen content (39.2%) for $FeCl_3$-CM-PANI-Ketjenblack than for $FeCl_3$-PANI-Ketjenblack (31.4%).

BET surface area measurements indicate a higher BET surface area (607 $m^2$/g) for the $FeCl_3$-CM-PANI-Ketjenblack catalyst than for the $FeCl_3$-PANI-Ketjenblack catalyst (264 $m^2$/g).

FIG. 5a provides a scanning electron micrograph (SEM) of the $FeCl_3$-PANI-Ketjenblack catalyst, and FIG. 5b provides an SEM of the $FeCl_3$-CM-PANI-Ketjenblack catalyst. The SEM of the CM-containing catalyst of FIG. 5b reveals a webbed structure for this catalyst. This webbed structure may contribute to the observed high activity in the high current region, which would facilitate mass transportation. The CM might act as a forming agent, resulting in the porous structure of the CM-containing catalyst.

The effects of varying the amount and type of carbon black were examined in a series of embodiment $FeCl_3$-CM-PANI-Ketchenblack catalysts prepared with the same amounts of $FeCl_3$, CM, and PANI, but with varying amounts of Ketchenblack (KB). Several embodiments were prepared using Black Pearl (BP) carbon black instead of Ketchenblack carbon black. Table 2 provides a listing of the amounts of starting materials for several embodiment catalysts that were prepared according to the embodiment procedure (vide supra).

TABLE 2

| Sample | cyanamide | aniline | Carbon support |
|---|---|---|---|
| 10/0.4 (KB) | 7.0 grams | 3.0 milliliters | 0.4 grams (KB) |
| 10/0.8 (KB) | 7.0 grams | 3.0 milliliters | 0.8 grams (KB) |
| 10/1.2 (KB) | 7.0 grams | 3.0 milliliters | 1.2 grams (KB) |
| 10/1.2 (BB) | 7.0 grams | 3.0 milliliters | 1.2 grams (BP) |
| 10/2.0 (BB) | 7.0 grams | 3.0 milliliters | 2.0 grams (BP) |
| 10/2.8 (BP) | 7.0 grams | 3.0 milliliters | 2.8 grams (BP) |

Results of cell performance for the first three catalysts listed in Table 2, all of which included the KB carbon black, are plotted in FIG. 6a and FIG. 6b. As the plots show, volumetric activity increased with increasing amounts of KB (up to 1.2 g) at the expense of decreases in current density at lower voltages. Increases beyond 1.2 grams had little or no effect on catalyst activity. FIG. 6b provides a plot of iR-free cell voltage versus volumetric current density. According to FIG. 6b, the iR-corrected volumetric activity at 0.8 V and 1.0 bar for the 10/1.2 sample (i.e. the third sample from Table 2) was 38 A/cm$^3$. The first entry gave the highest value for power density (0.75 W/cm$^2$). Surprisingly, no increase in activity was observed for the samples prepared with Black Pearl 2000 (BP) instead of KB as the carbon support, even though the BP carbon support had a higher surface area than did the KB. Transmission electron micrograph (TEM) images of these materials revealed a complete encapsulation of the carbon black particles, which may explain the observed lack of dependence of activity on surface area of carbon black.

Embodiment FeCl$_3$-CM-PANI-Ketchenblack catalysts were prepared according to the embodiment procedure (vide supra) but with the amounts of CM, FeCl$_3$, aniline, and Ketjenblack carbon support shown in Table 3. Embodiment cathodes and membrane electrode assemblies were prepared using these catalysts, and their fuel cell performance was evaluated. Fuel cell performance is plotted in FIGS. 7a and 7b.

TABLE 3

| Sample (CM/FC) | Cyanamide (grams) | Aniline (ml) | FeCl$_3$ (grams) | carbon support (grams) |
|---|---|---|---|---|
| 10.5/5.0 | 10.5 | 3.0 | 5.0 | 1.2 |
| 10.5/5.9 | 10.5 | 3.0 | 5.9 | 1.2 |
| 14.0/5.9 | 14.0 | 3.0 | 5.9 | 1.2 |
| 14.0/6.8 | 14.0 | 3.0 | 6.8 | 1.2 |

FIG. 7a provides polarization plots for various embodiment catalysts with varying CM/FC ratios (see column 1 of Table 3). The polarization plot of cell voltage (V) vs. current density (A/cm$^2$) reveals little change in fuel cell performance between the first entry (10.5/5.0) and the second entry (10.5/5.9). A slight increase in current density for cell voltage above 0.8 V was observed, but current densities decreased for voltages less than 0.7 volts. The volumetric activity for the fourth entry (14.0/6.8) was 64 A/cm$^3$, and the Tafel slope shown in FIG. 7b, which was calculated from linear regression method using three points, was approximately 56 mV/dec. The third entry (10.5/5.0) provided a value for power density of 0.79 W/cm$^2$ at 0.4 volts (V), which to our knowledge is the highest value for power density for a non-precious metal catalyst.

The effects of backpressure on activity were also examined. An embodiment FeCl$_3$-CM-PANI-Ketjenblack catalyst showed relatively high performance even without an applied backpressure.

In summary, embodiment catalysts suitable for cathodes for fuel cells were prepared using a iron salt, cyanamide, polyaniline, and carbon black. An embodiment FeCl$_3$-CM-PANI-Ketjenblack catalyst gave a volumetric activity of 64 A/cm$^3$ at 0.8 V (iR-corrected) in a membrane electrode assembly operated on H$_2$/O$_2$ at 1.0 bar applied backpressure. This catalyst shows a maximum power density of 0.79 W/cm$^2$ at 0.4 V in H$_2$/O$_2$ at 1 bar applied backpressure. This performance might be due at least in part to a porous webbed catalyst structure and increased nitrogen content and surface area.

In all embodiments of the present invention, all percentages are by weight of the total composition, unless specifically stated otherwise. All ratios are weight ratios, unless specifically stated otherwise. All ranges are inclusive and combinable. All documents cited in the Detailed Description of the Invention are, in relevant part, incorporated herein by reference; the citation of any document is not to be construed as an admission that it is prior art. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A catalyst prepared by a process comprising:
   adding an oxidant to a mixture of aniline, cyanamide, and a non-precious metal salt in an aqueous acid, the non-precious metal salt being selected from an iron salt, a cobalt salt, a manganese salt, and combinations thereof;
   adding carbon black to the mixture;
   drying the mixture;
   heating the mixture at a temperature of about 700° C. to about 1100° C. under an inert atmosphere;
   removing acid soluble components from the mixture; and
   heating the mixture again at a temperature of about 700° C. to about 1100° C. under an inert atmosphere.

2. The catalyst of claim 1, wherein the non-precious metal salt comprises a halide, acetate, sulfate, or phosphate.

3. The catalyst of claim 1, wherein the non-precious metal salt comprises an iron halide salt.

4. The catalyst of claim 1, wherein the oxidant comprises ammonium persulfate.

5. The catalyst of claim 1, wherein the carbon black comprises carbon black pretreated with nitric acid.

6. A catalyst composition prepared by a process comprising:
   mixing the catalyst of claim 1 with water and with an ionomer suspension.

7. The catalyst composition of claim 6, wherein the non-precious metal salt comprises a halide, acetate, sulfate, or phosphate.

8. The catalyst composition of claim 6, wherein the non-precious metal salt comprises an iron halide salt.

9. The catalyst composition of claim 6, wherein the ionomer suspension comprises an ionomer comprising a copolymer of a perfluorosulfonic acid and a polytetrafluoroethylene.

10. A membrane electrode assembly comprising:
a membrane; and
a gas diffusion layer;
wherein the catalyst composition of claim 6 is applied to a first side of the membrane and to a first side of the gas diffusion layer, and
the first side of the membrane is in direct contact with the first side of the gas diffusion layer.

11. The membrane electrode assembly of claim 10, wherein the iron salt is an iron halide salt.

12. The membrane electrode assembly of claim 10, wherein the iron salt is $FeCl_3$.

13. The membrane electrode assembly of claim 10, wherein the ionomer suspension comprises an ionomer comprising a copolymer of a perfluorosulfonic acid and a polytetrafluoroethylene.

14. A method of preparing a catalyst, comprising:
adding an oxidant to a mixture of aniline, cyanamide, and a non-precious metal salt in an aqueous acid,
the non-precious metal salt being selected from an iron salt, a cobalt salt, a manganese salt, and combinations thereof;
adding carbon black to the mixture;
drying the mixture;
heating the mixture at a temperature of about 700° C. to about 1100° C. under an inert atmosphere;
removing acid soluble components from the mixture; and
heating the mixture again at a temperature of about 700° C. to about 1100° C. under an inert atmosphere.

15. The method of claim 14, wherein the non-precious metal salt comprises a halide, acetate, sulfate, or phosphate.

16. The method of claim 14, wherein the non-precious metal salt comprises an iron halide salt.

17. The method of claim 14, wherein the oxidant comprises ammonium persulfate.

18. The method of claim 14, wherein the carbon black comprises carbon black pretreated with nitric acid.

* * * * *